US007826864B2

(12) United States Patent
Funnell et al.

(10) Patent No.: US 7,826,864 B2
(45) Date of Patent: Nov. 2, 2010

(54) APPARATUS AND METHOD FOR POWER MEASUREMENT SUMMATION IN MOBILE TELECOMMUNICATIONS SYSTEM USER EQUIPMENT

(75) Inventors: Nicola Funnell, Coleshill (GB); Andrew Farnsworth, Bromsgrove (GB); Chin Ying Cheung, Birmingham (GB)

(73) Assignee: M-Stack Limited, Birmingham (GB)

(*) Notice: Subject to any disclaimer, the term of this patent is extended or adjusted under 35 U.S.C. 154(b) by 1449 days.

(21) Appl. No.: 11/223,765

(22) Filed: Sep. 9, 2005

(65) Prior Publication Data

US 2007/0060191 A1 Mar. 15, 2007

(51) Int. Cl.
*H04B 7/00* (2006.01)
*H04B 1/00* (2006.01)
*H04B 7/216* (2006.01)
*H04B 1/10* (2006.01)
*H04W 36/00* (2009.01)
*H03H 7/30* (2006.01)
*H03H 7/40* (2006.01)
*H03K 5/159* (2006.01)
*H03K 5/01* (2006.01)
*H03K 6/04* (2006.01)
*H03D 1/06* (2006.01)
*H03D 11/04* (2006.01)
*H04L 1/00* (2006.01)
*H04L 25/08* (2006.01)

(52) U.S. Cl. .................. 455/525; 455/69; 455/436; 455/522; 370/331; 370/335; 370/342; 375/148; 375/235; 375/348

(58) Field of Classification Search ................ 455/10, 455/114.1, 114.2, 114.3, 7, 13.4, 69, 70, 455/226.1, 226.2, 331, 332, 333, 404.1, 404.2, 455/405, 418, 419, 420, 422, 423, 427, 436, 455/442, 456.1, 456.2, 515, 518, 519, 520, 455/522, 525, 54.1, 138, 84, 125, 126, 127.1, 455/127.2, 134, 136, 137, 168; 370/318, 370/334, 342, 336, 252, 311, 332, 335, 441, 370/476, 203–208, 210, 331, 430, 465, 480; 342/174, 357.06, 387, 442, 457, 465, 375, 342/200, 224, 235, 140, 141, 145–148, 149, 342/260, 345, 348, 377; 375/200, 224, 235, 375/140, 141, 145–148, 149, 260, 345, 348, 375/377

See application file for complete search history.

(56) References Cited

U.S. PATENT DOCUMENTS 4,613,990 A * 9/1986 Halpern ..................... 455/522

(Continued)

FOREIGN PATENT DOCUMENTS

WO WO 2004/075577 A1 9/2004

*Primary Examiner*—Andrew Wendell
*Assistant Examiner*—Paul P Tran
(74) *Attorney, Agent, or Firm*—Eckert Seamans Cherin & Mellott, LLC; Brij K. Argarwal, Esquire (57) ABSTRACT

Apparatus and a method for deriving a power measurement summation for use in universal mobile telecommunications system user equipment are disclosed. Conversion from a logarithm scale to a linear scale for summation and back again is avoided. The technique obviates the need for a mathematical processor to convert power measurements in a logarithmic scale (e.g. decibels dB, or dBw) into a linear scale (e.g. mW) to sum the power measurements or a ratio. The summed power component is calculated using data stored in the device (e.g. look up tables) without any need for conversion of the scale used.

10 Claims, 9 Drawing Sheets

U.S. PATENT DOCUMENTS

| | | | |
|---|---|---|---|
| 5,485,486 A * | 1/1996 | Gilhousen et al. | 370/335 |
| 6,226,271 B1 | 5/2001 | Dent | |
| 6,473,614 B1 * | 10/2002 | Quensel et al. | 455/436 |
| 6,493,541 B1 * | 12/2002 | Gunnarsson et al. | 455/69 |
| 7,187,646 B2 * | 3/2007 | Schramm | 370/206 |
| 2002/0101832 A1 * | 8/2002 | Chen et al. | 370/318 |
| 2003/0091132 A1 * | 5/2003 | Anderson | 375/345 |
| 2003/0174676 A1 * | 9/2003 | Willenegger et al. | 370/335 |
| 2004/0022228 A1 | 2/2004 | Tyra et al. | |
| 2004/0161030 A1 | 8/2004 | Mohindra et al. | |
| 2005/0059424 A1 * | 3/2005 | Sahota | 455/522 |

* cited by examiner

| dBm | mW |
|---|---|
| -40 | 0.0001 |
| -39 | 0.00012589 |
| -38 | 0.00015849 |
| -37 | 0.00019953 |
| -36 | 0.00025119 |
| -35 | 0.00031623 |
| -34 | 0.00039811 |
| -33 | 0.00050119 |
| -32 | 0.00063096 |
| -31 | 0.00079433 |
| -30 | 0.001 |
| -29 | 0.00125893 |
| -28 | 0.00158489 |
| -27 | 0.00199526 |
| -26 | 0.00251189 |
| -25 | 0.00316228 |
| -24 | 0.00398107 |
| -23 | 0.00501187 |
| -22 | 0.00630957 |
| -21 | 0.00794328 |
| -20 | 0.01 |

Fig. 3

| Unit | Value (out) | Value (in) |
|---|---|---|
| 9 | 1259 | 1001 -1259 |
| 8 | 1585 | 1260- 1585 |
| 7 | 1995 | 1586 - 1995 |
| 6 | 2512 | 1996 - 2512 |
| 5 | 3163 | 2513 - 3163 |
| 4 | 3981 | 3164 - 3981 |
| 3 | 5012 | 3982 - 5012 |
| 2 | 6310 | 5013 - 6310 |
| 1 | 7943 | 6311 - 7943 |
| 0 | 10000 | 7944 - 10000 |

| dBm | 1 / Ratio |
|---|---|
| 0 | 1 |
| 1 | 0.79432823 |
| 2 | 0.63095734 |
| 3 | 0.50118723 |
| 4 | 0.39810717 |
| 5 | 0.31622777 |
| 6 | 0.25118864 |
| 7 | 0.19952623 |
| 8 | 0.15848932 |
| 9 | 0.12589254 |
| 10 | 0.1 |
| 11 | 0.07943282 |
| 12 | 0.06309573 |
| 13 | 0.05011872 |
| 14 | 0.03981072 |
| 15 | 0.03162278 |
| 16 | 0.02511886 |
| 17 | 0.01995262 |
| 18 | 0.01584893 |
| 19 | 0.01258925 |
| 20 | 0.01 |

APPARATUS AND METHOD FOR POWER MEASUREMENT SUMMATION IN MOBILE TELECOMMUNICATIONS SYSTEM USER EQUIPMENT

BACKGROUND

1. Technical Field

This application relates to mobile telecommunications systems in general, having particular application in UMTS (Universal Mobile Telecommunications System) in general, and in particular relates to an apparatus and method for power measurement summation in mobile telecommunications system user equipment.

2. Description of the Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a typical cellular radio system, mobile user equipment (UE) communicates via a radio access radio network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

In the following, reference will be made to UMTS and to particular standards. However it should be understood that the invention is not intended to be limited to any particular mobile telecommunications system.

The radio access network covers a geographical area divided into a plurality of cell areas. Each cell area is served by at least one base station, which in UMTS may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless mobile device, generally referred to as user equipment (UE), that complies with the 3GPP specifications for the UMTS protocol. The 3GPP 25.331 specification, v.3.15.0, referred to herein as the 25.331 specification, addresses the subject of UMTS RRC (Radio Resource Control) protocol requirements between the UMTS Terrestrial Radio Access Network (UTRAN) and the UE.

Power may be measured on a linear scale (e.g. Watts) or on a logarithmic scale (e.g. decibels (dB)). There are many instances of power measurements in 3G and some of these include summing power measurements from a number of cells to determine operating conditions of the network and/or the user equipment. For instance, among others, clauses 14.1.2.1 and 14.1.2.2 of the 25.331 specification relate to intra-frequency reporting events for FDD (Frequency Division Duplex) systems and set out the conditions for determining whether the user equipment is to trigger the start of an event. For instance, the UE determines whether there is a triggering condition for pathloss by calculating the following:

$$10 \cdot \mathrm{Log} M_{New} + CIO_{New} \leq$$
$$W \cdot 10 \cdot \mathrm{Log}\left(1 \Big/ \sum_{i=1}^{N_A}(1/M_i)\right) + (1-W) \cdot 10 \cdot \mathrm{Log} M_{Best} + (R_{1a} - H_{1a}/2)$$

where, in particular, M represents power measurements in Watts i.e. on a linear scale. However power measurements are in many cases received in decibels i.e. on a logarithmic scale. To sum these for the purposes of equations such as those shown above, it would therefore be necessary to convert these measurements to the linear scale, sum the measurements and then use a log function to convert the result back to the logarithmic scale.

The maths processor needed by a device to carry out such a conversion may be unjustified given other processing demands of a device. There is thus a need to calculate a sum of power measurements without having to carry out these conversions. There are thus proposed strategies for power measurement summation in mobile telecommunications system user equipment. A number of such strategies are detailed below.

Other aspects and features of the proposed strategies will become apparent to those ordinarily skilled in the art upon review of the following description of specific embodiments of an apparatus and method for power measurement summation in mobile telecommunications system user equipment.

BRIEF DESCRIPTION OF THE DRAWINGS

Embodiments will now be described, by way of example only, with reference to the attached drawings, in which.

The same reference numerals are used in different figures to denote similar elements.

DETAILED DESCRIPTION OF THE DRAWINGS

A method and apparatus for power measurement summation in mobile telecommunications system user equipment is described. In the following description, for the purposes of explanation, numerous specific details are set forth in order to provide a thorough understanding of the present invention. It will be apparent, however, to one skilled in the art that the present invention may be practised without these specific details. In other instances, well-known structures and devices are shown in block diagram form in order to avoid unnecessarily obscuring the present invention.

The needs identified in the foregoing Background, and other needs and objects that will become apparent from the following description, are achieved by, in one aspect, a method for processing power measurements in a mobile telecommunications device. In other aspects, the invention encompasses apparatus and a computer-readable medium configured to carry out the foregoing steps. In particular, the method may be implemented in a mobile telecommunications device, with or without voice capabilities, or other electronic devices such as handheld or portable devices.

As employed herein, "BMC" shall mean Broadcast/Multicast Control, as commonly referred in the art. As employed herein, "PDCP" shall mean Packet Data Convergence Protocol, as commonly referred in the art. As employed herein, "RLC" shall mean Radio Link Control, as commonly referred in the art. As employed herein, "MAC" shall mean Medium Access Control, as commonly referred in the art. As employed herein, "RUIM" shall mean Removable User Identity Module, as commonly referred in the art. As employed herein, "CCPCH" shall mean Common Control Physical Channel, as commonly referred in the art. As employed herein, "Cell_DCH" shall mean Cell Dedicated Channel, as commonly referred in the art. As employed herein, "CPICH" shall mean Common Pilot Channel, as commonly referred in the art. As employed herein, "RSCP" shall mean Received Signal Code Power, as commonly referred in the art.

Figure 1:
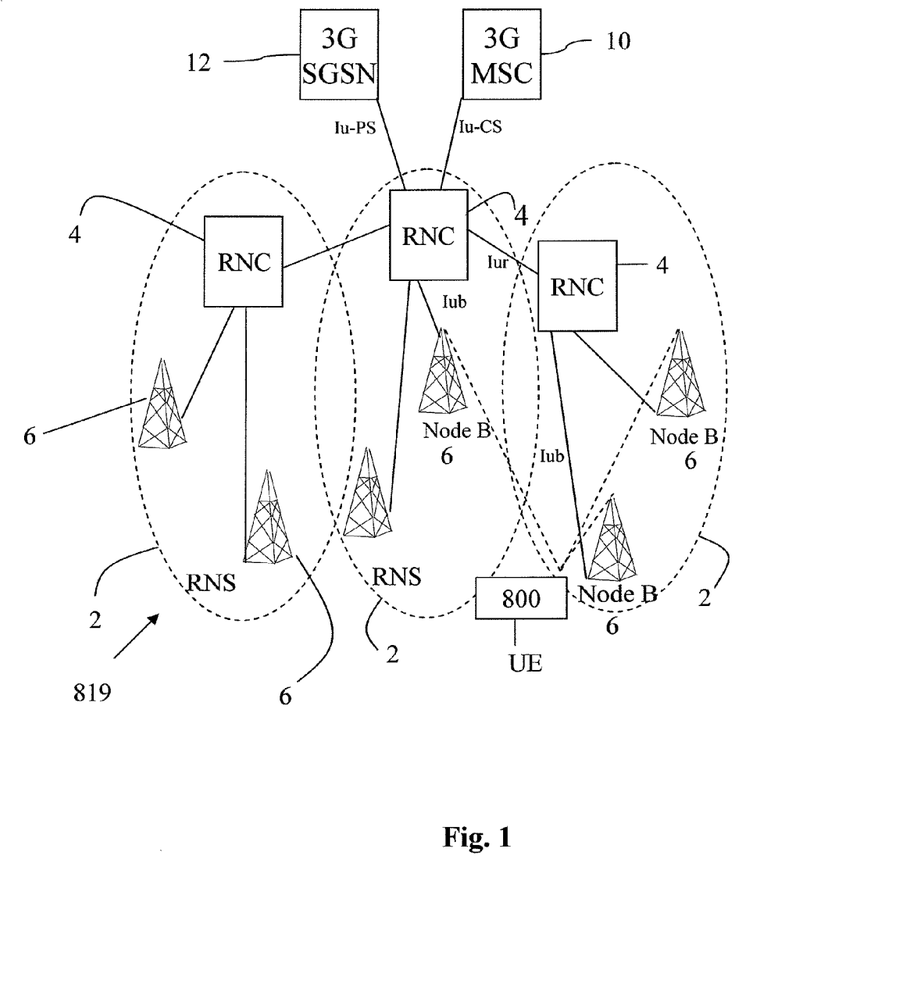
FIG. 1 shows an overview of a network and user equipment device.

Referring to the drawings, FIG. 1 shows an overview of a network and a UE device. Clearly in practice there may be many UE devices operating with the network but, for the sake of simplicity, FIG. 1 only shows a single UE device 800. For the purposes of illustration, FIG. 1 also shows a network 819 having a few components. It will be clear to a person skilled in the art that in practice a network will include far more components than those shown.

FIG. 1 shows an overview of the radio access network 819 (UTRAN) used in a UMTS system. The network 819 as shown in FIG. 1 comprises three Radio Network Subsystems (RNS) 2. Each RNS has a Radio Network Controller (RNC) 4. Each RNS 2 has one or more Node B 6 which are similar in function to a Base Transmitter Station of a GSM radio access network. User Equipment UE 800 may be mobile within the radio access network. Radio connections (indicated by the straight dotted lines in FIG. 1) are established between the UE and one or more of the Node Bs in the UTRAN.

The radio network controller controls the use and reliability of the radio resources within the RNS 2. Each RNC may also connected to a 3G mobile switching centre 10 (3G MSC) and a 3G serving GPRS support node 12 (3G SGSN).

An RNC 4 controls one or more Node B's. An RNC plus its Node B's together make up an RNS 2. A Node B controls one or more cells. Each cell is uniquely identified by a frequency and a primary scrambling code (primary CPICH in FDD, primary CCPCH in TDD).

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link. A single physical Node B 6 may operate as more than one cell since it may operate at multiple frequencies and/or with multiple scrambling codes.

Figure 2:
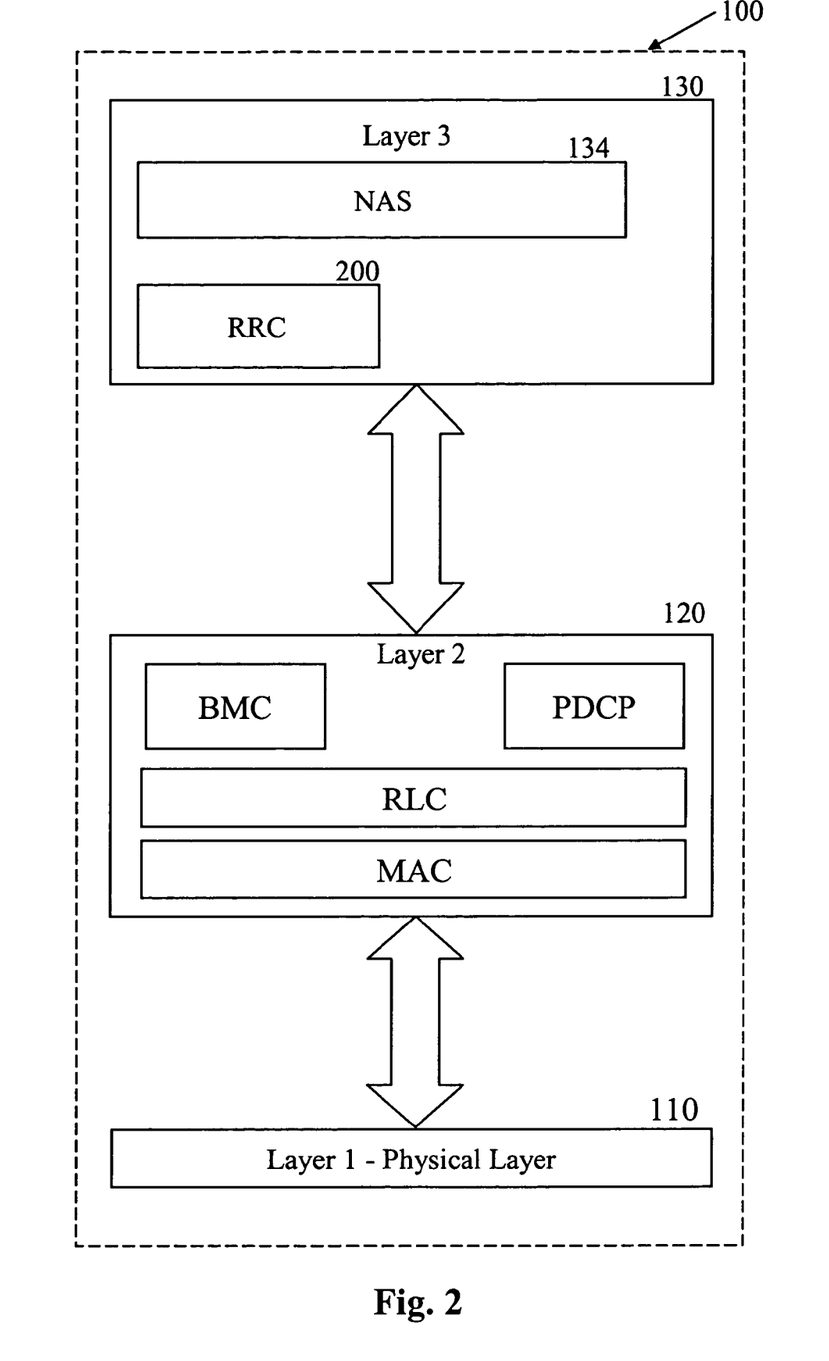
FIG. 2 is a block diagram illustrating an embodiment of a protocol stack apparatus provided with a RRC block.

FIG. 2 is a block diagram illustrating an embodiment of a protocol stack provided in a UE. A Radio Resource Controller (RRC) block 200 is a sub layer of Layer 3 130 of a UMTS protocol stack 100. The RRC 200 exists in the control plane only and provides an information transfer service to the non-access stratum NAS 134. The RRC 200 is responsible for controlling the configuration of radio interface Layer 1 110 and Layer 2 120. When the UTRAN wishes to change the UE configuration it will issue a message to the UE containing a command to invoke a specific RRC procedure. The RRC 200 layer of the UE decodes this message and initiates the appropriate RRC procedure. Generally when the procedure has been completed (either successfully or not) then the RRC sends a response message to the UTRAN (via the lower layers) informing the UTRAN of the outcome. It should be noted that there are a few scenarios where the RRC will not issue a response message to the UTRAN and, in those cases the RRC need not and does not reply.

The RRC block 200 can implement several different behaviour strategies for power measurement summation in mobile telecommunications system user equipment. These are summarised below, and then explained in detail subsequently, with reference to the drawings.

The technique obviates the need for a mathematical processor to convert power measurements in a logarithmic scale (e.g. decibels dB, or dBm) into a linear scale (e.g. mW) to sum the power measurements or a ratio. The summed power component is calculated using data stored in the device (e.g. look up tables) without any need for conversion of the scale used. Then technique provides ways of resolving certain equations set out in 25.331 which are used when the UE is in Cell_DCH (dedicated mode). In this situation it is the UTRAN rather than the UE which decides which cells form part of the active set. The UMTS terminology for this is soft handover.

The proposed technique is applicable to any formula that requires the summation of power measurements that are in a logarithmic scale, commonly decibels. We will consider, for the sake of example, the equations given in section 14.1.2.1 and 14.1.2.2 of the 25.331 standard, in particular equation 1 (Triggering condition for pathloss), Equation 2 (Triggering condition for all other measurement quantities), Equation 3 (Leaving triggering condition for pathloss) and Equation 4 (Leaving triggering condition for all other measurement quantities). However it will be clear to a person skilled in the art that the technique is applicable in other circumstances where a summation of power measurements is required, in particular in telecommunications environments other than the 3G.

For pathloss measurements, the equations contain the following component:

$$10 \cdot \text{Log}\left(1 / \sum_{i=1}^{N_A} 1/M_i\right) \tag{1}$$

where $N_A$ is the number of cells in the active set and $M_i$ is the power ratio of each cell. In 3G the maximum value of $N_A$ is 6.

For other measurements, the equations contain the following component:

$$10 \cdot \text{Log}\left(\sum_{i=1}^{N_A} M_i\right) \tag{2}$$

The proposed technique involves deriving a power measurement for use in a mobile telecommunications system comprising a network of a plurality of cells and at least one user equipment device, the method being carried out in the user equipment.

Power in decibels is usually expressed as follows:

$$\text{Power (dB)} = 10\log_{10}(M_1/M_2) \quad (3)$$

where M is power measurement in Watts. However power may also be expressed in terms of voltage, power being proportional to the square of voltage. Power may therefore be represented by the formula $$\text{Power (dB)} = 20\log_{10}(V_1/V_2) \quad (4)$$

Cell power in mW may be represented using two integers, value (v) and factor (f) as follows:

$$\text{Power (mW)} = v \ast 10^{(f-4)} \quad (5)$$

so, for example, 0.00501187 mW is approximately $5012 \ast 10^{-6}$ giving v=5012 and f=-2.

The FIG. 10 is used in equation (5) above since it is used in equation (3), the expression of power in dB when the linear value is in Watts. However, it will be appreciated by a person skilled in the art that, if the cell power was measured in voltage, the FIG. 10 may be replaced by the FIG. 20, from Equation (4).

Figure 3:
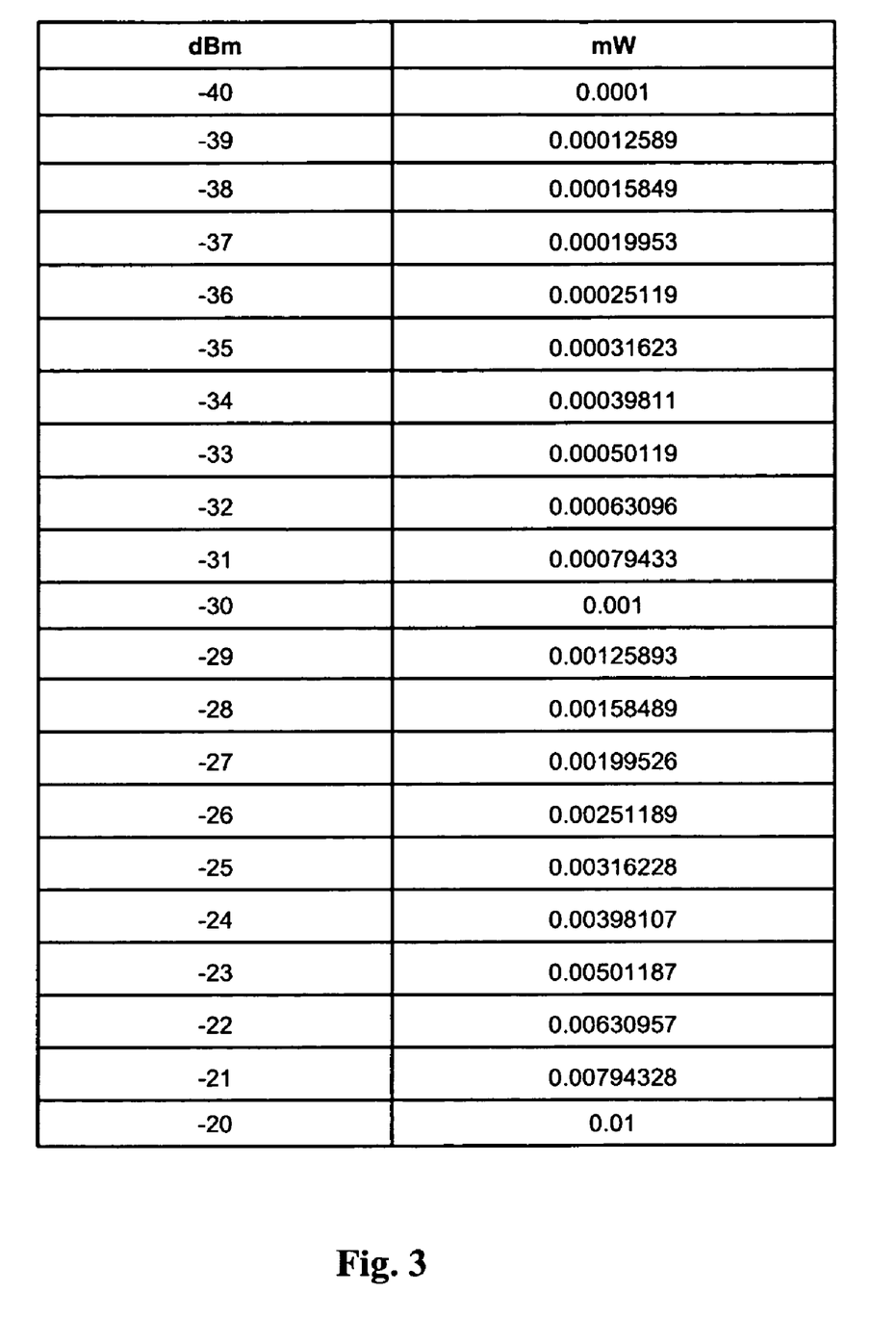
FIG. 3 shows power in dBm and the corresponding power in mW.
Figure 4:
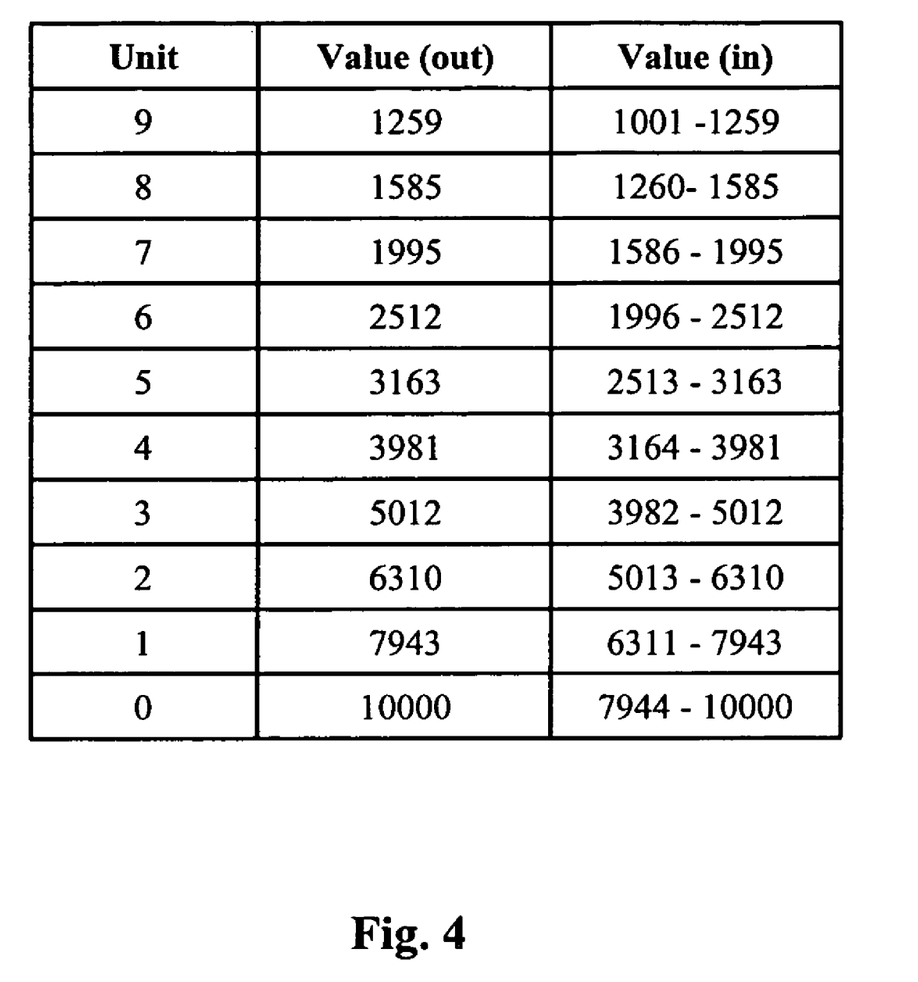
FIG. 4 is an example of the contents of a data store.

FIG. 3 shows –dBm to mW conversion examples. As demonstrated in FIG. 3, it can be seen that the value part repeats itself every 10 dBm and so the value part may be represented by an integer from 0 to 9 which indexes into a look up table to extract the value. This integer will be referred to as a unit parameter. An example of the data stored in the device to provide the look up table is shown in FIG. 4. The left hand column represents the unit parameter, the central column represents the value parameter and the right hand column represents a range of value used to determine a group unit value as will be described further below.

Figure 5:
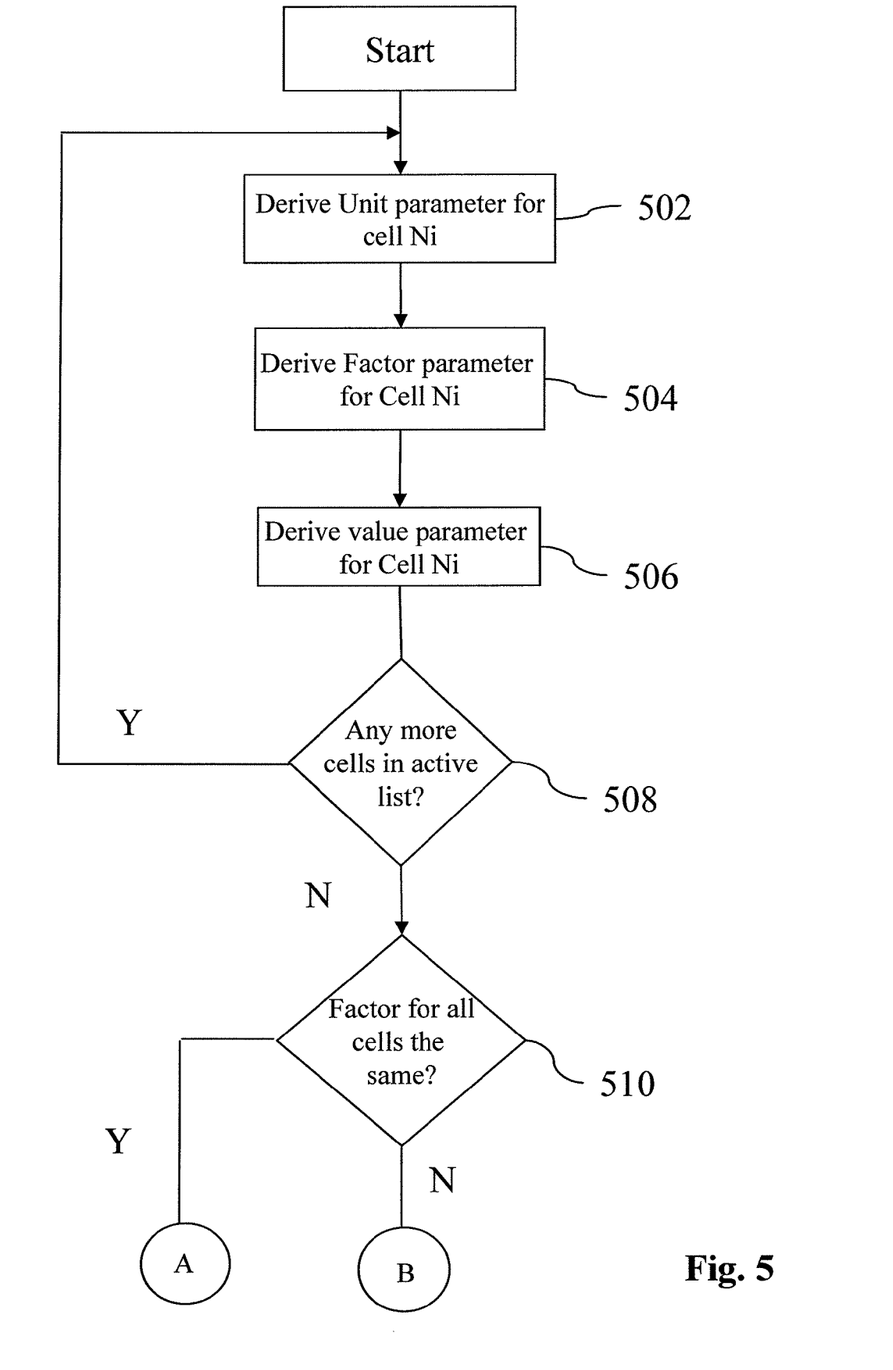
FIG. 5 is a flow diagram illustrating an implementation of a method for power measurement calculation.

The technique will now be described further with reference to FIG. 5, which is a flow diagram illustrating the calculation of the summed power component.

For each cell in a group of cells in an active list the user equipments receives a power measurement, said power measurement being of a logarithmic scale e.g. decibels dB or dBm. The process by which the UE acquires these power measurements is well known and will not be discussed further here. However further details may be found in the 3GPP specification 25.133, in particular in clauses 8.1.2.2 and 9.1.1, for CPICH RSCP measurements. According to the 3G standard the maximum number of cells in an active list is 6.

For each cell, the UE derives a unit parameter (502) dependent upon the power measurement. In one particular embodiment, this unit parameter is related to the power measurement modulus 10 i.e. the remainder when the power measurement d (in decibels) is divided by 10. So if the power measurement is 36 dB then the unit parameter derived from 36 modulus 10 is 6, as will be discussed further below.

For each cell, the UE then derives a factor parameter (504) dependent upon the power measurement. In one particular embodiment, this factor parameter is related to the decade of the power measurement i.e. if the power measurement is 36 dB then the factor parameter is 3, as will be discussed further below.

For each cell, the UE then derives a value parameter (506) dependent upon the unit parameter. This is achieved by means of looking up data stored in the device. The device stores data which provides a direct output for the value parameter for a given unit parameter, as will be discussed further below.

This is carried out for each cell until all cells in the active list have been processed (508).

Having derived the unit, factor and value parameters for each cell, a check is carried out to see if the cells have the same factor (510). If not, the value parameter and the associated factor parameter for each cell are then adjusted (512) so that the factor for each cell is the same. If the cells do not all have the same factor, then the lowest factor may be used as the base factor for the summing of the power and the cells which do not have a factor equal to the base factor have their value and factor adjusted accordingly. For instance, the value is multiplied by 10 and one is subtracted from the factor until the factor for the cell is the same as the base factor. If the factors for all the cells are the same then this step (512) is not carried out.

The value parameters for the cells (adjusted if necessary at step 512) are then summed (514) to generate a group value parameter and an associated group factor parameter and then the group value parameter and the group factor parameter are adjusted (516) to cause the group value parameter to fall within a given range, as will be described further below.

A group unit parameter is then derived (518) dependent upon the adjusted group value parameter; and a summed power measurement is then derived (520) dependent on the group unit parameter and the adjusted group factor parameter. This output (522) may then be used in, for instance, equations using formulas (1) and (2) above.

To illustrate the technique, particular implementations of the technique will now be describe with reference to Equations 1, 2, 3 and 4 of section 14.1.2.1 if the 25.331 standard.

EXAMPLE 1

CPICH RSCP Measurements

CPICH RSCP and CPICH EcN0 measurements require calculation of formula (2) above i.e.

$$10 \cdot \text{Log}\left(\sum_{i=1}^{N_A} M_i\right) \quad (2)$$

where $N_A$ is the number of cells in an active list. $M_i$ for CPICH RSCP is the power in mW of each cell and $M_i$ for CPICH EcN0 $M_i$ is the power ratio of each cell.

This component may be calculated as follows:

For each cell concerned, calculate unit parameter u and factor parameter f from power d in dBm $$u = -d \text{ modulus } 10 \quad (6)$$

$$f = -1 \ast \text{truncate } (-d/10) \quad (7)$$

This is applicable to cells which have a negative power in dBm. This is the case for CPICH RSCP, which is defined to be between –115 and –25 (and L1 passes –167 to 0).

A worked example is illustrated in the table below, for $N_A$ equal to 4:

|  | Cell 1 | Cell 2 | Cell 3 | Cell 4 |
|---|---|---|---|---|
| Power dBm | d1 = –113 | d2 = –94 | d3 = –39 | d4 = –25 |
| Unit | u1 = 3 | u2 = 4 | u3 = 9 | u4 = 5 |
| Factor | f1 = –11 | f2 = –9 | f3 = –3 | f4 = –2 |

The value for each cell is then derived using the unit parameter and a look up table of values. It has been found that for power in dBm the corresponding power in mW repeats every 10 dBm but is a factor of 10 bigger as the dBm value increases. For instance, −40 dBm corresponds to 0.001 mW, −30 dBm corresponds to 0.001 mW etc. There is therefore provided a look up table of unit parameter to value parameter, for example as shown in FIG. 4.

Thus, for each cell, the unit parameter determines the value to be read from the data

|  | Cell 1 | Cell 2 | Cell 3 | Cell 4 |
|---|---|---|---|---|
| Power dBm | d1 = −113 | d2 = −94 | d3 = −39 | d4 = −25 |
| Unit | u1 = 3 | u2 = 4 | u3 = 9 | u4 = 5 |
| Factor | f1 = −11 | f2 = −9 | f3 = −3 | f4 = −2 |
| Value | 5012 | 3981 | 1259 | 3162 |

The values then need to be added but first the values have to be adjusted for the lowest factor involved, in this case −11 (cell 1):

|  | Cell 1 | Cell 2 | Cell 3 | Cell 4 |
|---|---|---|---|---|
| Power dBm | d1 = −113 | d2 = −94 | d3 = −39 | d4 = −25 |
| Unit | u1 = 3 | u2 = 4 | u3 = 9 | u4 = 5 |
| Factor | f1 = −11 | f2 = −11 | f3 = −11 | f4 = −11 |
| Value | 5012 | 398100 | 125900000000 | 3162000000000 |

Then the values are added to produce a group value:

5012+398100+125900000000+3162000000000=3287900403112

Then the group value 3287900403112 and group factor −11 are adjusted to bring the value v in the range $1000 < v \leq 10000$ (i.e. the range in the look up table).

So the group value 3287900403112 is adjusted to 3288 and the factor is adjusted from −11 to −2. Then the value 3288 is looked up in the look up table to determine the unit parameter. For the example shown in FIG. 4, the value 3288 (right hand column) returns a unit parameter of 4.

The following calculation is then carried out:

$$\text{Power (dBm)} = (10 * f) - u \qquad (7)$$

$$= (10 * -2) - 4$$

$$= -20 - 4$$

$$= -24$$

This figure may then be used in place of formula (2) in an equation, for instance Equation 2 as shown in part 14.1.2.1 of the 25.331 standard.

EXAMPLE 2

CPICH EcN0 Measurements

CPICH EcN0 is expressed in terms of dB rather than dBm, and needs to be converted to a ratio rather than mW, however the processing is the same as for CPICH RSCP measurements and so the same functions can be used.

Again this is applicable to for cells which have a negative power in dB. This is the case for CPICH_EcN0 which is defined to be between −24 and 0 (and L1 passes −40 to 0).

EXAMPLE 3

Pathloss Measurements

Pathloss measurements require calculation of formula (1) above i.e.

$$10 \cdot \text{Log}\left(1 \bigg/ \sum_{i=1}^{N_A} 1/M_i\right) \qquad (1)$$

where $N_A$ is the number of cells in an active list and $M_i$ is the power ratio of each cell.

The component equation for pathloss measurements is different from that of CPICH RSCP and CPICH EcN0 measurements so the calculation is different. The inverse pathloss ratio is needed, since it is the inverse pathloss ratio that is summed in the pathloss component equation (e.g. Equation 1 and 3 of section 14.1.2.1 of the 25.331 standard).

The conversion table from dBm to the inverse pathloss ratio is similar to CPICH RSCP, although the range of values is different as they are always positive. The same value and factor can be used to represent the inverse pathloss ratio.

$$1/\text{Pathloss Ratio} = v * 10^{(f-4)} \qquad (8)$$

Figure 6:
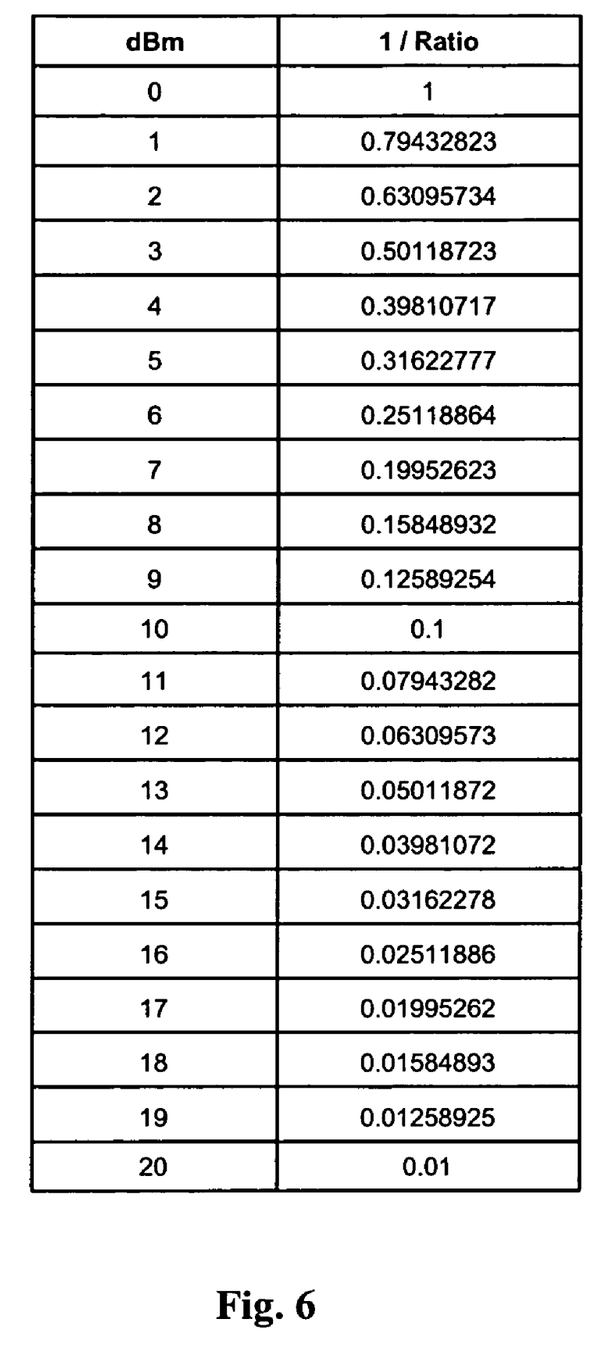
FIG. 6 shows power in dBm and the corresponding inverse pathloss ratio.

FIG. 6 shows −dBm to pathloss ratio conversion examples. As demonstrated in FIG. 6, it can be seen that the value part repeats itself every 10 dBm steps and so the value component can use the same look up table as used for CPICH RSCP and CPICH EcN0 measurements.

The component equation (1) may be calculated as follows:

For each cell concerned, calculate unit parameter u and factor parameter f for the inverse ratio from power d in dBm as follows:

$$\text{Unit } u = d \text{ modulus } 10 \qquad (9)$$

$$\text{Factor } f = \text{truncate } (-d/10) \qquad (10)$$

This is applicable to cells which have a positive pathloss power in dBm. This is the case in 3G as pathloss is defined to be between 15 and 165.

A worked example is illustrated in the table below, for $N_A$ equal to 4:

|  | Cell 1 | Cell 2 | Cell 3 | Cell 4 |
|---|---|---|---|---|
| Power dBm | d1 = 113 | d2 = 94 | d3 = 39 | d4 = 25 |
| Unit | u1 = 3 | u2 = 4 | u3 = 9 | u4 = 5 |
| Factor | f1 = −11 | f2 = −9 | f3 = −3 | f4 = −2 |

Note that the factor is made negative due to the inversion of the ratio in formula (1).

The value for each cell is then derived using the unit parameter and the look up table of values as discussed above with reference to the CPICH RSCP measurements.

Thus, for each cell, the unit parameter determines the value to be read from the data store:

|  | Cell 1 | Cell 2 | Cell 3 | Cell 4 |
|---|---|---|---|---|
| Power dBm | d1 = 113 | d2 = 94 | d3 = 39 | d4 = 25 |

-continued

|  | Cell 1 | Cell 2 | Cell 3 | Cell 4 |
|---|---|---|---|---|
| Unit | u1 = 3 | u2 = 4 | u3 = 9 | u4 = 5 |
| Factor | f1 = −11 | f2 = −9 | f3 = −3 | f4 = −2 |
| Value | 5012 | 3981 | 1259 | 3162 |

The values then need to be added but first the values have to be adjusted for the lowest factor involved, −11 in this case (cell 4):

|  | Cell 1 | Cell 2 | Cell 3 | Cell 4 |
|---|---|---|---|---|
| Power dBm | d1 = 113 | d2 = 94 | d3 = 39 | d4 = 25 |
| Unit | u1 = 3 | u2 = 4 | u3 = 9 | u4 = 5 |
| Factor | f1 = −11 | f2 = −11 | f3 = −11 | f4 = −11 |
| Value | 5012 | 398100 | 125900000000 | 3162000000000 |

Then the values are added to produce a group value:

3162000000000+125900000000+398100+5012=3287900403112

Then the group value 3287900403112 and group factor −11 are adjusted to bring the value v in the range 1000<v<=10000 (i.e. the range in the look up table).

So the value 3287900403112 is adjusted to 3288 and the factor is adjusted from −11 to −2. Then the value 3288 is looked up in the look up table shown in FIG. 4 which returns a unit parameter of 4.

The following calculation is then carried out:

$$\text{Pathloss Power (dBm)} = (-10 * f) + u \qquad (11)$$
$$= (-10 * -2) + 4$$
$$= 20 + 4$$
$$= 24$$

This figure may then be used in place of formula (1) in an equation, for instance Equation 1 as shown in part 14.2.1.1 of the 25.331 standard.

The techniques as described above, and in particular with reference to Examples 1, 2 and 3, calculate the power summation component for cells and provide a worst case accuracy of around +/−6 dBm. The accuracy is dependent on the number of cells in the active set and also the number of points in the look up table used. To improve on this accuracy an extended look up table with more entries may be used.

In a further development, which may be used in addition or alternatively to the techniques discussed above, those cells which have a power measurement lower that a threshold below the strongest cell may be excluded. For example, in the techniques as discussed above, some of the cells in the active set may be excluded from the calculation. For instance, cells having a power measurement that is below a threshold may be excluded from the calculation. This reduces the processing required but, depending on the threshold chosen, should not significantly influence the total power calculated. Other examples of situations in which cells may be excluded on the basis of power measurement relative to the strongest cell are in equations (1) and (2) without the use of the factor, unit and value calculations as discussed above.

If the power of a cell in the active set is sufficiently smaller than the best cell in the active set, such that including the cell in the total power calculation does not significantly affect the result, then the cell can be excluded from the calculation. By excluding some cells from the calculation the amount of calculation that the UE must do to calculate the component value is reduced.

For instance if there are 4 cells in the active set, but one of them is very weak, then this weak cell will not significantly add to the component value. This cell may therefore be excluded and the calculation performed using the 3 strong cells.

Let us assume that an inaccuracy of the component calculation of z dBm can be tolerated. Therefore any cells which do not raise the total power by z dBm need not be included in the calculation. It is possible to calculate the power of a cell which raises the total power by z dBm and hence the threshold can be calculated relative to the best cell below which the cell can be removed from the cells to be considered.

Let X be the power of the best cell in dBm.
Let Y be the power of the cell to be considered in dBm.

$$\text{Total power} = 10 \times \text{Log (sum of powers in mW)}$$

$$X+z = 10 \times \text{Log}(10^{X/10}+10^{Y/10})$$

$$10^{X/10+z/10} = 10^{X/10}+10^{Y/10}$$

$$10^{X/10} \times 10^{z/10} = 10^{X/10}+10^{Y/10}$$

$$10^{z/10} = 1+10^{(Y-X)/10}$$

$$10^{z/10}-1 = 10^{(y-x)/10}$$

$$\text{Log}(10^{z/10}-1) = (Y-X)/10$$

$$Y-X = 10 \times \text{Log}(10^{z/10}-1) = \text{Delta dBm}$$

$$Y=X+10 \times \text{Log}(10^{z/10}-1) \qquad (12)$$

So, for an active set of three cells, there are two cells to consider for exclusion from the summation. For a tolerated inaccuracy of 1 dBm in the summation, that is an average contribution of 0.5 dBm from each. Calculating Delta dBm (12) for z equal to 0.5 dBm gives Delta dBm equal to −9 dBm. Thus, if the threshold is set such that cells which do not each contribute more than 0.5 dBm to the total power are excluded, then any cell whose power is −9 dBm less that the best cell will be excluded.

A worked example is shown below:

|  | Cell 1 | Cell 2 | Cell 3 | Cell 4 |
|---|---|---|---|---|
| Power dBm | d1 = −113 | d2 = −94 | d3 = −35 | d4 = −25 |

Consider an active list of three cells, cells 2, 3 and 4. Cell 4 is the strongest cell (X) with a power of −25 dBm. Say that 0.5 dBm is the threshold (z). Putting these figures in the equation (12):

$$\text{Delta dBm} = 10 \times \text{Log}(10^{z/10}-1) = Y-X$$

gives Delta dBm=−9 dBm and therefore the threshold of Y equal to X+Delta dBm, which in this case is −25−9=−34 dBm. Any cells with a strength of −35 dBm or less may therefore be excluded from the summation. In the example above, this is all the cells other than cell 4

We can now consider an active list of four cells, e.g. cells, 1, 2, 3 and 4 as shown in the table above. For an overall inaccuracy of 1 dBm and four cells in the active list, there are three cells to consider for exclusion from the summation. For a tolerated inaccuracy of 1 dBm in the summation, that is an average contribution of 0.33 dBm from each. Calculating Delta dBm (12) for z equal to 0.33 dBm gives Delta dBm equal to −11 dBm. Any cells with a strength of (−24−11) i.e. −36 dBm or less may therefore be excluded from the summation. In the example above, this is all the cells other than cells 3 and 4

This idea can be extended so that the threshold varies depending on the number of cells in the active set and the desired accuracy of the calculation. There could be a look up table for the threshold value depending on the number of cells in the active set.

For example, for an overall inaccuracy of 1 dBm, the following look up table may be provided:

| Number of Cells $N_A$ | z dBm | Delta dBm |
|---|---|---|
| 2 | 1 | −5.9 |
| 3 | 0.5 | −9.1 |
| 4 | 0.33 | −11.0 |
| 5 | 0.25 | −12.3 |
| 6 | 0.2 | −13.3 |

If we consider that we want an overall accuracy of 1 dBm and if we have 2 cells in the active set, then we can exclude the weaker cell if it increases the component by 1 dBm and hence must be within −6 dBm of the strongest cell.

If we have 6 cells in the active set, then any of the 5 weaker cells which increase the component by ⅕ dBm may be excluded and hence must be within −13 dBm of the strongest cell.

Figure 7:
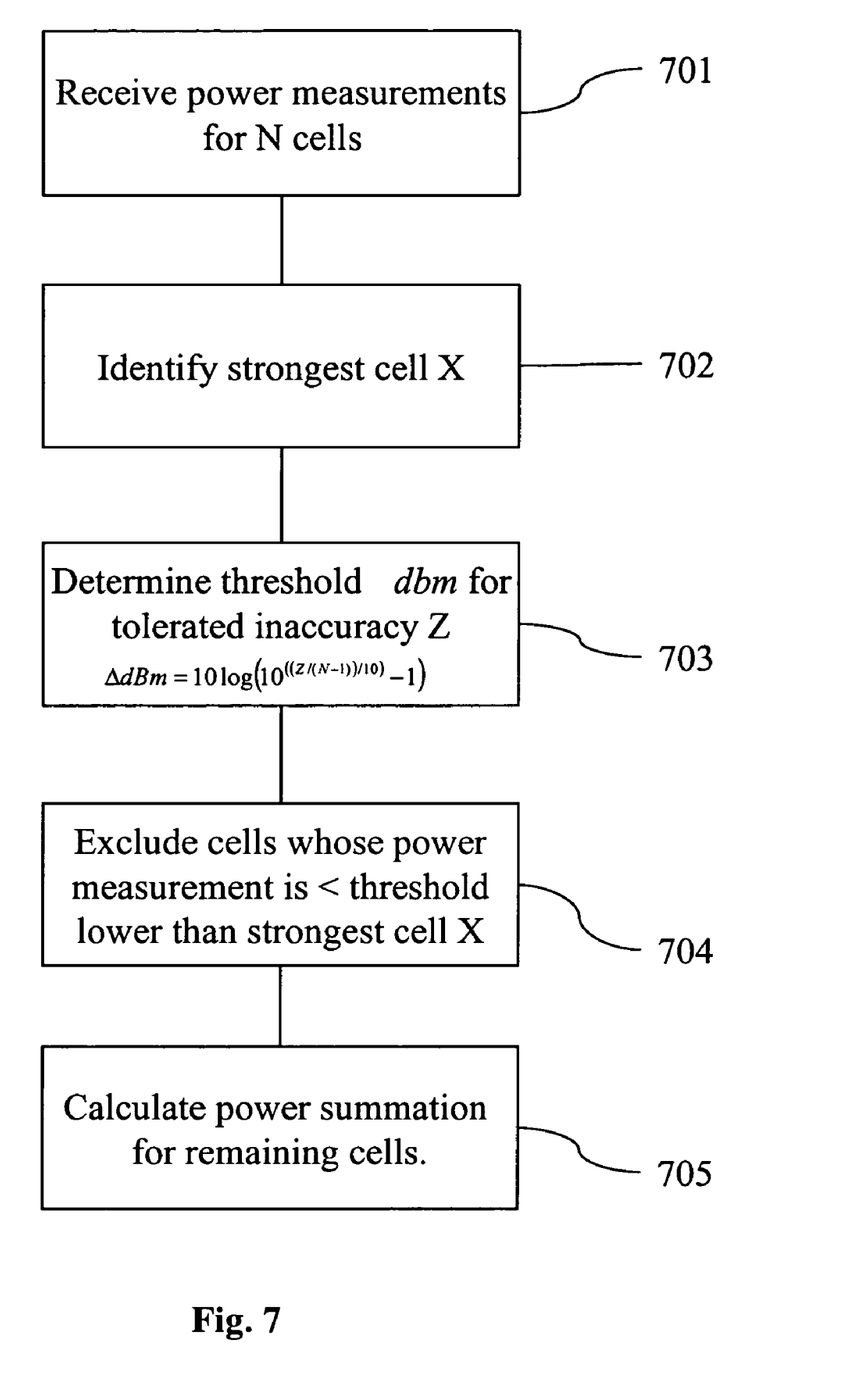
FIG. 7 is a flow chart illustrating a further development.

In short, if there are N cells in the active list and an overall inaccuracy of Z dBm may be tolerated, then any cells which increase the power summation component by $Z/(N-1)$ dBm and are hence within $10 \times Log(10^{(Z/(N-1))/10}-1)$ of the strongest cell in the active set may be excluded. This is illustrated in FIG. 7. Power measurements for cells are received by the UE (step 701). The UE then identifies the strongest cell (cell X) (step 702). The UE then determines the threshold ΔdBm to be applied relative to the strongest cell (step 703) for a tolerated inaccuracy of Z. This is calculated from the equation $10 \times Log(10^{(Z/(N-1))/10}-1)$. The UE then excludes from the summation those cells whose power measurement is at least ΔdBm weaker than the strongest cell X (step 704) and proceeds to calculate the power summation (step 705).

Figure 8:
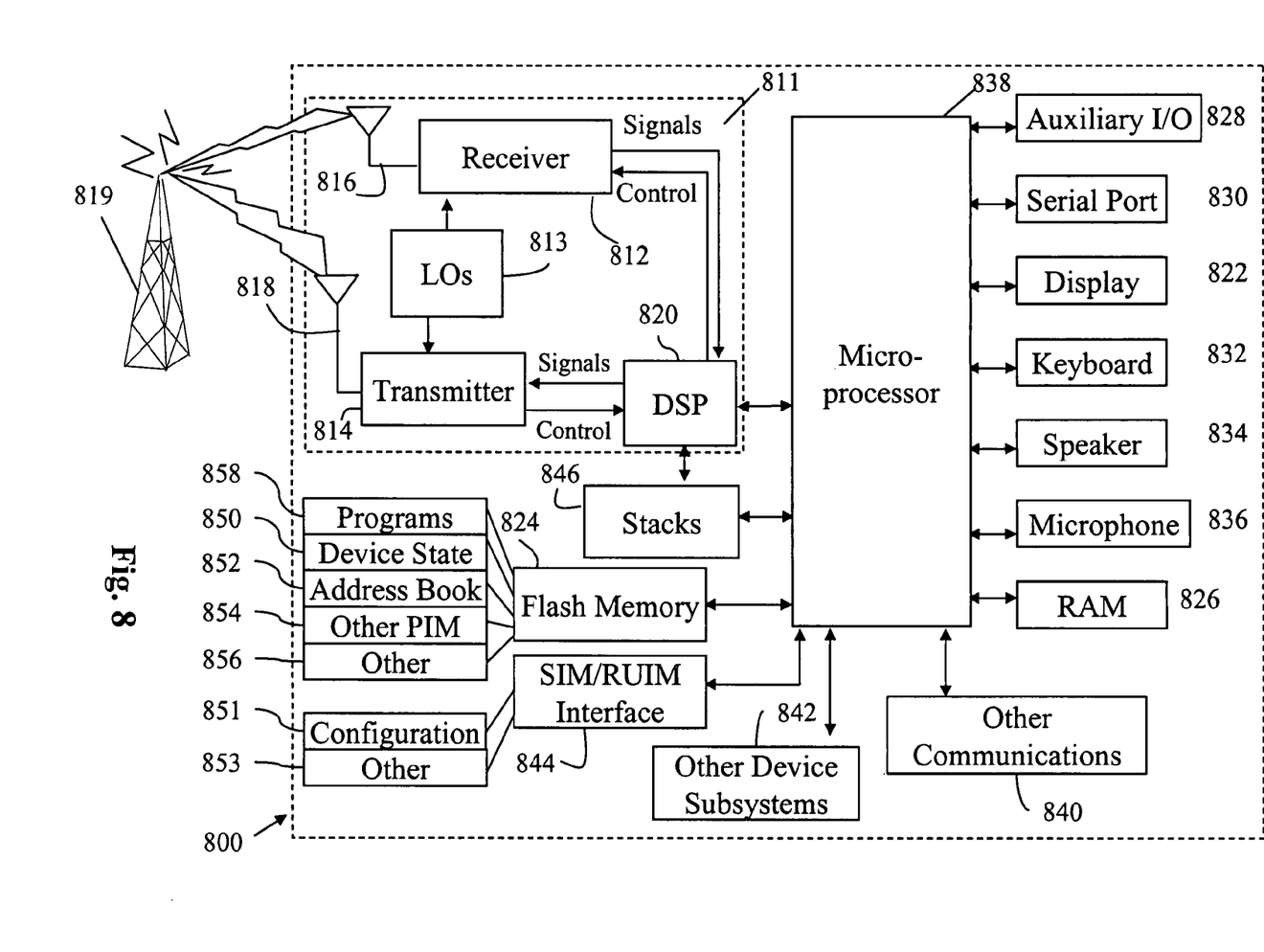
FIG. 8 is a block diagram illustrating a mobile device, which can act as a UE and co-operate with the apparatus and methods of FIGS. 1 to 6.

Turning now to FIG. 8, FIG. 8 is a block diagram illustrating a mobile device, which can act as a UE and co-operate with the apparatus and methods of FIGS. 1 to 7, and which is an exemplary wireless communication device. Mobile station 800 is preferably a two-way wireless communication device having at least voice and data communication capabilities. Mobile station 800 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 800 is enabled for two-way communication, it will incorporate a communication subsystem 811 including both a receiver 812 and a transmitter 814, as well as associated components such as one or more, preferably embedded or internal, antenna elements 816 and 818, local oscillators (LOs) 813, and a processing module such as a digital signal processor (DSP) 820. As will be apparent to those skilled in the field of communications, the particular design of the communication subsystem 811 will be dependent upon the communication network in which the device is intended to operate. For example, mobile station 800 may include a communication subsystem 811 designed to operate within the Mobitex™ mobile communication system, the DataTAC™ mobile communication system, GPRS network, UMTS network, or EDGE network.

Network access requirements will also vary depending upon the type of network 802. For example, in the Mobitex and DataTAC networks, mobile station 800 is registered on the network using a unique identification number associated with each mobile station. In UMTS and GPRS networks, however, network access is associated with a subscriber or user of mobile station 800. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 800 will be unable to carry out any other functions involving communications over the network 802. The SIM interface 844 is normally similar to a card-slot into which a SIM card can be inserted and ejected like a diskette or PCMCIA card. The SIM card can have approximately 64K of memory and hold many key configuration 851, and other information 853 such as identification, and subscriber related information.

When required network registration or activation procedures have been completed, mobile station 800 may send and receive communication signals over the network 802. Signals received by antenna 816 through communication network 802 are input to receiver 812, which may perform such common receiver functions as signal amplification, frequency down conversion, filtering, channel selection and the like, and in the example system shown in FIG. 8, analog to digital (A/D) conversion. A/D conversion of a received signal allows more complex communication functions such as demodulation and decoding to be performed in the DSP 820. In a similar manner, signals to be transmitted are processed, including modulation and encoding for example, by DSP 820 and input to transmitter 814 for digital to analog conversion, frequency up conversion, filtering, amplification and transmission over the communication network 802 via antenna 818. DSP 820 not only processes communication signals, but also provides for receiver and transmitter control. For example, the gains applied to communication signals in receiver 812 and transmitter 814 may be adaptively controlled through automatic gain control algorithms implemented in DSP 820.

Mobile station 800 preferably includes a microprocessor 838 which controls the overall operation of the device. Communication functions, including at least data and voice communications, are performed through communication subsystem 811. Microprocessor 838 also interacts with further device subsystems such as the display 822, flash memory 824, random access memory (RAM) 826, auxiliary input/output (I/O) subsystems 828, serial port 830, keyboard 832, speaker 834, microphone 836, a short-range communications subsystem 840 and any other device subsystems generally designated as 842.

Some of the subsystems shown in FIG. 8 perform communication-related functions, whereas other subsystems may provide "resident" or on-device functions. Notably, some subsystems, such as keyboard 832 and display 822, for example, may be used for both communication-related functions, such as entering a text message for transmission over a communication network, and device-resident functions such as a calculator or task list.

Operating system software used by the microprocessor 838 is preferably stored in a persistent store such as flash memory 824, which may instead be a read-only memory (ROM) or similar storage element (not shown). Those skilled in the art will appreciate that the operating system, specific device applications, or parts thereof, may be temporarily loaded into a volatile memory such as RAM 826. Received communication signals may also be stored in RAM 826.

As shown, flash memory 824 can be segregated into different areas for both computer programs 858 and program data storage 850, 852, 854 and 856. These different storage types indicate that each program can allocate a portion of flash memory 824 for their own data storage requirements. Microprocessor 838, in addition to its operating system functions, preferably enables execution of software applications on the mobile station. A predetermined set of applications that control basic operations, including at least data and voice communication applications for example, will normally be installed on mobile station 800 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 802. In a preferred embodiment, the PIM data items are seamlessly integrated, synchronized and updated, via the wireless network 802, with the mobile station user's corresponding data items stored or associated with a host computer system. Further applications may also be loaded onto the mobile station 800 through the network 802, an auxiliary I/O subsystem 828, serial port 830, short-range communications subsystem 840 or any other suitable subsystem 842, and installed by a user in the RAM 826 or preferably a non-volatile store (not shown) for execution by the microprocessor 838. Such flexibility in application installation increases the functionality of the device and may provide enhanced on-device functions, communication-related functions, or both. For example, secure communication applications may enable electronic commerce functions and other such financial transactions to be performed using the mobile station 800.

In a data communication mode, a received signal such as a text message or web page download will be processed by the communication subsystem 811 and input to the microprocessor 838, which preferably further processes the received signal for output to the display 822, or alternatively to an auxiliary I/O device 828. A user of mobile station 800 may also compose data items such as email messages for example, using the keyboard 832, which is preferably a complete alphanumeric keyboard or telephone-type keypad, in conjunction with the display 822 and possibly an auxiliary I/O device 828. Such composed items may then be transmitted over a communication network through the communication subsystem 811.

For voice communications, overall operation of mobile station 800 is similar, except that received signals would preferably be output to a speaker 834 and signals for transmission would be generated by a microphone 836. Alternative voice or audio I/O subsystems, such as a voice message recording subsystem, may also be implemented on mobile station 800. Although voice or audio signal output is preferably accomplished primarily through the speaker 834, display 822 may also be used to provide an indication of the identity of a calling party, the duration of a voice call, or other voice call related information for example.

Serial port 830 in FIG. 8, would normally be implemented in a personal digital assistant (PDA)-type mobile station for which synchronization with a user's desktop computer (not shown) may be desirable, but is an optional device component. Such a port 830 would enable a user to set preferences through an external device or software application and would extend the capabilities of mobile station 800 by providing for information or software downloads to mobile station 800 other than through a wireless communication network. The alternate download path may for example be used to load an encryption key onto the device through a direct and thus reliable and trusted connection to thereby enable secure device communication.

Other communications subsystems 840, such as a short-range communications subsystem, is a further optional component which may provide for communication between mobile station 800 and different systems or devices, which need not necessarily be similar devices. For example, the subsystem 840 may include an infrared device and associated circuits and components or a Bluetooth™ communication module to provide for communication with similarly enabled systems and devices.

When mobile device 800 is used as a UE, protocol stacks 846 include apparatus and a method for power measurement summation in mobile telecommunications system user equipment.

EXTENSIONS AND ALTERNATIVES

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have shown steps being carried out in a particular order. However, it would be clear to a person skilled in the art that the order of some of the evaluation is immaterial with respect to the operation of the method. The ordering of the steps as described herein is not intended to be limiting.

It is also to be noted that where a method has been described it is also intended that protection is also sought for a device arranged to carry out the method and where features have been claimed independently of each other these may be used together with other claimed features.

The invention claimed is:

1. A method for deriving a power measurement summation for use in a mobile telecommunications system, the system comprising a network of a plurality of cells and at least one user equipment device, the method comprising, in the user equipment:

receiving for each cell in a group of cells a power measurement, said power measurement being of a logarithmic scale;

determining from data stored in the user equipment a corresponding value for each power measurement on a linear scale of measurement;

summing the corresponding values;

for each cell:

deriving a unit parameter dependent upon the power measurement, deriving a factor parameter dependent upon the power measurement, and deriving a value parameter dependent upon the unit parameter;

having derived the unit, factor and value parameters for each cell, adjusting the value parameter and the associated factor parameter for each cell to cause the factor parameters for each cell to become the same;

summing the adjusted value parameters for the cells to generate a group value parameter and an associated group factor parameter;

adjusting the group value parameter and the group factor parameter meter to cause the group value parameter to fall within a given range;

deriving a group unit parameter dependent upon the adjusted group value parameter; and deriving a power measurement summation dependent on the group unit parameter and the adjusted group factor parameter;

wherein the power measurement summation is of the form $$10 \cdot \text{Log}\left(1 \Big/ \sum_{i=1}^{N_A} 1/M_i\right)$$

where $N_A$ is the number of cells to be summed and $M_i$ is the power ratio of a cell and the unit parameter is derived by the following formula:

unit=d modulus 10 and the factor parameter is derived by the following formula:

factor=truncate($-d/10$)

where d is the power for a cell in decibels.

2. A computer readable storage medium comprising instructions executable by a processor for carrying out the method of claim 1.

3. A method for deriving a power measurement summation for use in a mobile telecommunications system, the system comprising a network of a plurality of cells and at least one user equipment device the method comprising, in the user equipment:

receiving for each cell in a group of cells a power measurement, said power measurement being of a logarithmic scale;

determining from data stored in the user equipment a corresponding value for each power measurement on a linear scale of measurement;

summing the corresponding values;

for each cell:
deriving a unit parameter dependent upon the power measurement, deriving a factor parameter dependent upon the power measurement, and deriving a value parameter dependent upon the unit parameter;

having derived the unit, factor and value parameters for each cell, adjusting the value parameter and the associated factor parameter for each cell to cause the factor parameters for each cell to become the same;

summing the adjusted value parameters for the cells to generate a group value parameter and an associated group factor parameter;

adjusting the group value parameter and the group factor parameter to cause the group value parameter to fall within a given range;

deriving a group unit parameter dependent upon the adjusted group value parameter; and deriving a power measurement summation dependent on the group unit parameter and the adjusted group factor parameter;

wherein the power measurement summation is of the form $$10 \cdot \text{Log}\left(\sum_{i=1}^{N_A} M_i\right)$$

where $N_A$ is the number of cells to be summed and $M_i$ is the power in mW of a cell and the unit parameter is derived by the following formula:

unit=$-d$ modulus 10 and the factor parameter is derived by the following formula:

factor=$-1^*$ truncate($-d/10$)

where d is the power for a cell in decibels.

4. A method for deriving a power measurement summation for use in a mobile telecommunications system, the system comprising a network of a plurality of cells and at least one user equipment device, the method comprising, in the user equipment:

receiving for each cell in a group of cells a power measurement, said power measurement being of a logarithmic scale;

determining from data stored in the user equipment a corresponding value for each power measurement on a linear scale of measurement;

summing the corresponding values;

excluding from the group of cells any cells the power of which is below a threshold dependent on the power measurement of the strongest cell; and wherein, for N cells in an active list and an overall inaccuracy toleration of Z dBm, excluding any cells which are within $10 \times \text{Log}(10^{(z/(N-1))/10}-1)$ of the strongest cell in the active set.

5. An apparatus for deriving a power measurement summation for use in a mobile telecommunications system, the system comprising a network of a plurality of cells and at least one user equipment device, the apparatus comprising, in the user equipment, a processor arranged, in use, to carry out the following steps:

receiving for each cell in a group of cells a power measurement, said power measurement being of a logarithmic scale;

determining from data stored in the user equipment a corresponding value for each power measurement on a linear scale of measurement;

summing the corresponding values;

for each cell:
deriving a unit parameter dependent upon the power measurement, deriving a factor parameter dependent upon the power measurement, and deriving a value parameter dependent upon the unit parameter;

having derived the unit, factor and value parameters for each cell, adjusting the value parameter and the associated factor parameter for each cell to cause the factor parameters for each cell to become the same;

summing the adjusted value parameters for the cells to generate a group value parameter and an associated group factor parameter;

adjusting the group value parameter and the group factor parameter to cause the group value parameter to fall within a given range;

deriving a group unit parameter dependent upon the adjusted group value parameter; and deriving a power measurement summation dependent on the group unit parameter and the adjusted group factor parameter;

wherein the power measurement summation is of the form $$10 \cdot \text{Log}\left(1 \Big/ \sum_{i=1}^{N_A} 1/M_i\right)$$

where $N_A$ is the number of cells to be summed and $M_i$ is the power ratio of a cell and the unit parameter is derived by the following formula:

unit=$d$ modulus 10 and the factor parameter is derived by the following formula:

factor=truncate($-d$/10)

where d is the power for a cell in decibels.

6. An apparatus for deriving a power measurement summation for use in a mobile telecommunications system, the system comprising a network of a plurality of cells and at least one user equipment device, the apparatus comprising, in the user equipment, a processor arranged, in use, to carry out the following steps:

receiving for each cell in a group of cells a power measurement, said power measurement being of a logarithmic scale;

determining from data stored in the user equipment a corresponding value for each power measurement on a linear scale of measurement;

summing the corresponding values;

for each cell:
  deriving a unit parameter dependent upon the power measurement,
  deriving a factor parameter dependent upon the power measurement, and
  deriving a value parameter dependent upon the unit parameter;

having derived the unit, factor and value parameters for each cell, adjusting the value parameter and the associated factor parameter for each cell to cause the factor parameters for each cell to become the same;

summing the adjusted value parameters for the cells to generate a group value parameter and an associated group factor parameter;

adjusting the group value parameter and the group factor parameter to cause the group value parameter to fall within a given range;

deriving a group unit parameter dependent upon the adjusted group value parameter; and deriving a power measurement summation dependent on the group unit parameter and the adjusted group factor parameter;

wherein the power measurement summation is of the form $$10 \cdot \text{Log}\left(\sum_{i=1}^{N_A} M_i\right)$$

where $N_A$ is the number of cells to be summed and $M_i$ is the power in mW of a cell and the unit parameter is derived by the following formula:

unit=$-d$ modulus 10 and the factor parameter is derived by the following formula:

factor=$-1$* truncate($-d$/10)

where d is the power for a cell in decibels.

7. An apparatus for deriving a power measurement summation for use in a mobile telecommunications system, the system comprising a network of a plurality of cells and at least one user equipment device, the apparatus comprising, in the user equipment, a processor arranged, in use, to carry out the following steps:

receiving for each cell in a group of cells a power measurement, said power measurement being of a logarithmic scale;

determining from data stored in the user equipment a corresponding value for each power measurement on a linear scale of measurement;

summing the corresponding values;

wherein, for N cells in an active list and an overall inaccuracy toleration of Z dBm, excluding any cells which are within $10 \times \text{Log}(10^{(Z/(N-1))/10} - 1)$ of the strongest cell in the active set.

8. A method for deriving a power measurement summation for use in a mobile telecommunications system, the system comprising a network of a plurality of cells and at least one user equipment device, the method comprising, in the user equipment:

receiving for each cell in a group of cells a power measurement, excluding from the summation any cells the power of which is below a threshold determined by the power measurement of the strongest cell; and wherein, for N cells in a group of cells and an overall inaccuracy toleration of Z dBm, excluding any cells which are within $10 \times \text{Log}(10^{(Z/(N-1))/10} - 1)$ of the strongest cell in the group of cells.

9. A computer readable storage medium comprising instructions executable by a processor for carrying out the method of claim 8.

10. An apparatus for deriving a power measurement summation for use in a mobile telecommunications system, the system comprising a network of a plurality of cells and at least one user equipment device, the apparatus comprising, in the user equipment, a processor arranged, in use, to carry out the following steps:

receiving for each cell in a group of cells a power measurement, excluding from the summation any cells the power of which is below a threshold determined by the power measurement of the strongest cell; and wherein, for N cells in a group of cells and an overall inaccuracy toleration of Z dBm, excluding any cells which are within $10 \times \text{Log}(10^{(Z/(N-1))/10} - 1)$ of the strongest cell in the group of cells.

* * * * *